United States Patent [19]

Kervagoret

[11] Patent Number: 4,705,324
[45] Date of Patent: Nov. 10, 1987

[54] BRAKE-PRESSURE CONTROL AND MODULATION SYSTEM FOR AN ANTILOCKING BRAKE CIRCUIT ASSEMBLY COMPONENT FOR A DISC BRAKE

[75] Inventor: Gilbert Kervagoret, Argenteuil, France

[73] Assignee: Societe Anonyme D.B.A., Paris, France

[21] Appl. No.: 741,651

[22] Filed: Jun. 5, 1985

[30] Foreign Application Priority Data

Jun. 13, 1984 [FR] France ................. 84 09206

[51] Int. Cl.⁴ .................. B60T 8/00; B60T 13/14; F15B 7/00
[52] U.S. Cl. ................ 303/119; 60/545; 251/129.21; 303/68; 303/114
[58] Field of Search ........... 303/114, 119, 117, 68–69, 303/61–63, 6 R, 113, 50–56, 115, 116, 118, 6 C, 100, 10; 188/181, 345, 349, 354, 355–360; 60/545, 582, 591, 585–589; 251/129.21, 129.22, 129.07, 129.2

[56] References Cited

U.S. PATENT DOCUMENTS

| | | | |
|---|---|---|---|
| 3,729,235 | 4/1973 | Bach et al. | 303/114 |
| 3,827,763 | 8/1974 | Kobashi et al. | 303/114 |
| 3,921,666 | 11/1975 | Leiber | 303/119 X |
| 3,972,382 | 8/1976 | Takayama et al. | 303/114 X |
| 3,989,063 | 11/1976 | Brouwers et al. | 251/129.21 X |
| 4,142,707 | 3/1979 | Bjorklund | 251/129.2 X |
| 4,346,942 | 8/1982 | Leiber | 303/114 X |
| 4,421,359 | 12/1983 | Hayashi et al. | 303/10 X |
| 4,494,800 | 1/1985 | Hayashi | 188/349 X |
| 4,523,791 | 6/1985 | Belart et al. | 303/114 X |
| 4,561,701 | 12/1985 | Fujii et al. | 303/119 |
| 4,579,393 | 4/1986 | Sato et al. | 303/6 C |

FOREIGN PATENT DOCUMENTS

| | | |
|---|---|---|
| 0105219 | 4/1984 | European Pat. Off. . |
| 0156677 | 10/1985 | European Pat. Off. . |
| 0168286 | 1/1986 | European Pat. Off. ............ 303/119 |
| 2532260 | 3/1984 | France . |
| 2536493 | 5/1984 | France . |
| 1360774 | 7/1974 | United Kingdom . |
| 1402363 | 8/1975 | United Kingdom . |
| 1437656 | 6/1976 | United Kingdom . |
| 2020764 | 11/1979 | United Kingdom . |
| 2086510 | 5/1982 | United Kingdom . |

OTHER PUBLICATIONS

Bosch Technische Berichte, Band 7 (1980), Heft 2, ISSN 0006-789X, pp. 65, 76, 77.

Primary Examiner—Douglas C. Butler
Attorney, Agent, or Firm—Ronald D. Welch; Larry J. Palgura; Ken C. Decker

[57] ABSTRACT

In a body (3) enclosing at least one brake-pressure control device actuated manually (1, 1') there is mounted an isolating and pressure-reducing solenoid valve mechanism (18, 24) which selectively establishes communication between a brake circuit (22) and, on the one hand, the fluid outlet (8) of the device (1) and, on the other hand, a reservoir (10), the solenoid valve mechanism comprising a discharge end (30) emerging in an extension (33) of the reservoir (10).

8 Claims, 4 Drawing Figures

BRAKE-PRESSURE CONTROL AND MODULATION SYSTEM FOR AN ANTILOCKING BRAKE CIRCUIT ASSEMBLY COMPONENT FOR A DISC BRAKE

The present invention relates to the brake pressure control and modulation systems for at least one antilocking brake circuit of a motor vehicle, of the type comprising, inside a body, a brake-pressure control device which can be actuated manually and is provided with a fluid outlet connected to the brake circuit, a brake fluid reservoir mounted on the body, and an isolating and pressure-reducing solenoid valve means in the brake circuit.

Such a system is described, for example, in the document GB-A-2,086,510. Such systems comprise conventionally a sub-assembly consisting of the brake-pressure control device of the hydrostatic, hydrodynamic or mixed type, and of a reservoir mounted on the body of the said device, and an isolating and pressure-reducing solenoid valve means arranged in the brake circuit in the vicinity of the associated brake motors, thus requiring appreciable lengths of hydraulic return tubing to the reservoir which not only complicate the lay-out of the vehicle and involve considerable costs, but also require a large amount of brake fluid and consequently lead to increased response times.

It is known, moreover, to group solenoid valve means of antilocking brake circuits in a modulation unit, as described, for example, in the document GB-A-2,020,764, this type of system having, however, the same drawbacks as those mentioned above.

The object of the present invention is to propose a brake-pressure control and modulation system in the form of a compact group which is small in size, operates reliably and accuratley, eliminates most of the hydraulic tubing, is modular in design, does not cost much to manufacture and assemble and can be rapidly and easily fitted to a vehicle without having specially to adapt the latter.

To this end, according to a characteristic feature of the invention, the solenoid valve means is mounted on the body and has a discharge end which emerges in the reservoir.

According to a more specific characteristic feature, the solenoid valve means is of the type with a fluid passage running through it and comprises a casing arranged between the body and an extension of the reservoir, the discharge end being engaged in a leak-tight manner in this extension of the reservoir.

According to another characteristic feature of the invention, the solenoid valve means comprises a distribution valve part which is located opposite the discharge end and mounted in a seating in the body, which seating communicates with the fluid outlet of the brake-pressure control device and with the brake circuit.

Other characteristic features and advantages of the present invention will become apparent from the following description of an embodiment given by way of illustration but in no way limiting, with reference to the attached drawings in which.

Figure 1:
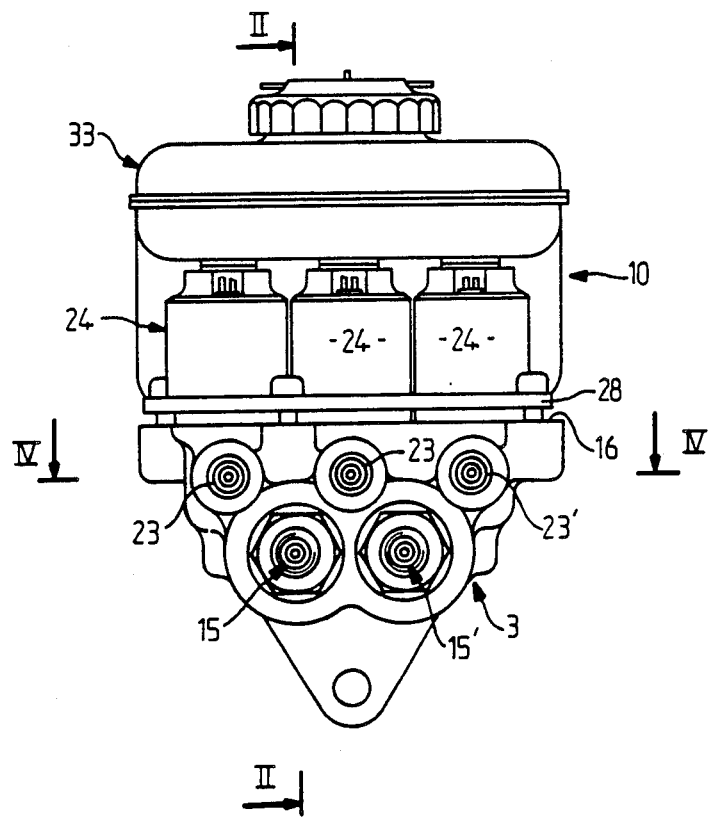
FIG. 1 is a front view of a brake control and modulation group according to the invention.
Figure 4:
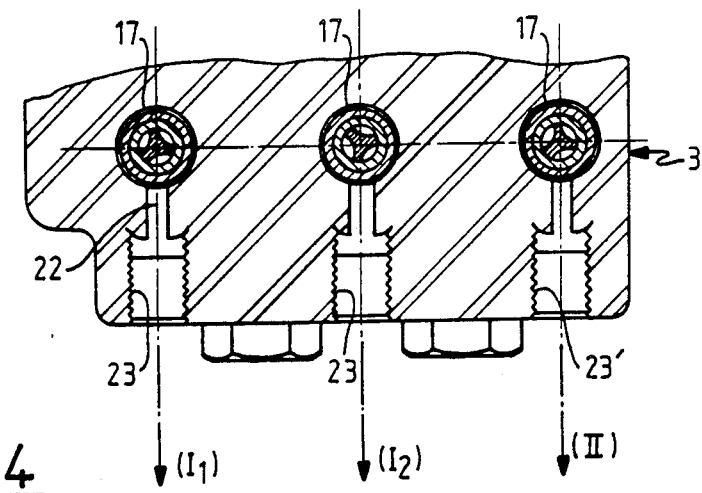
FIG. 4 is a view, in partial section, along the cutting plane IV—IV of FIG. 1.
Figure 2:
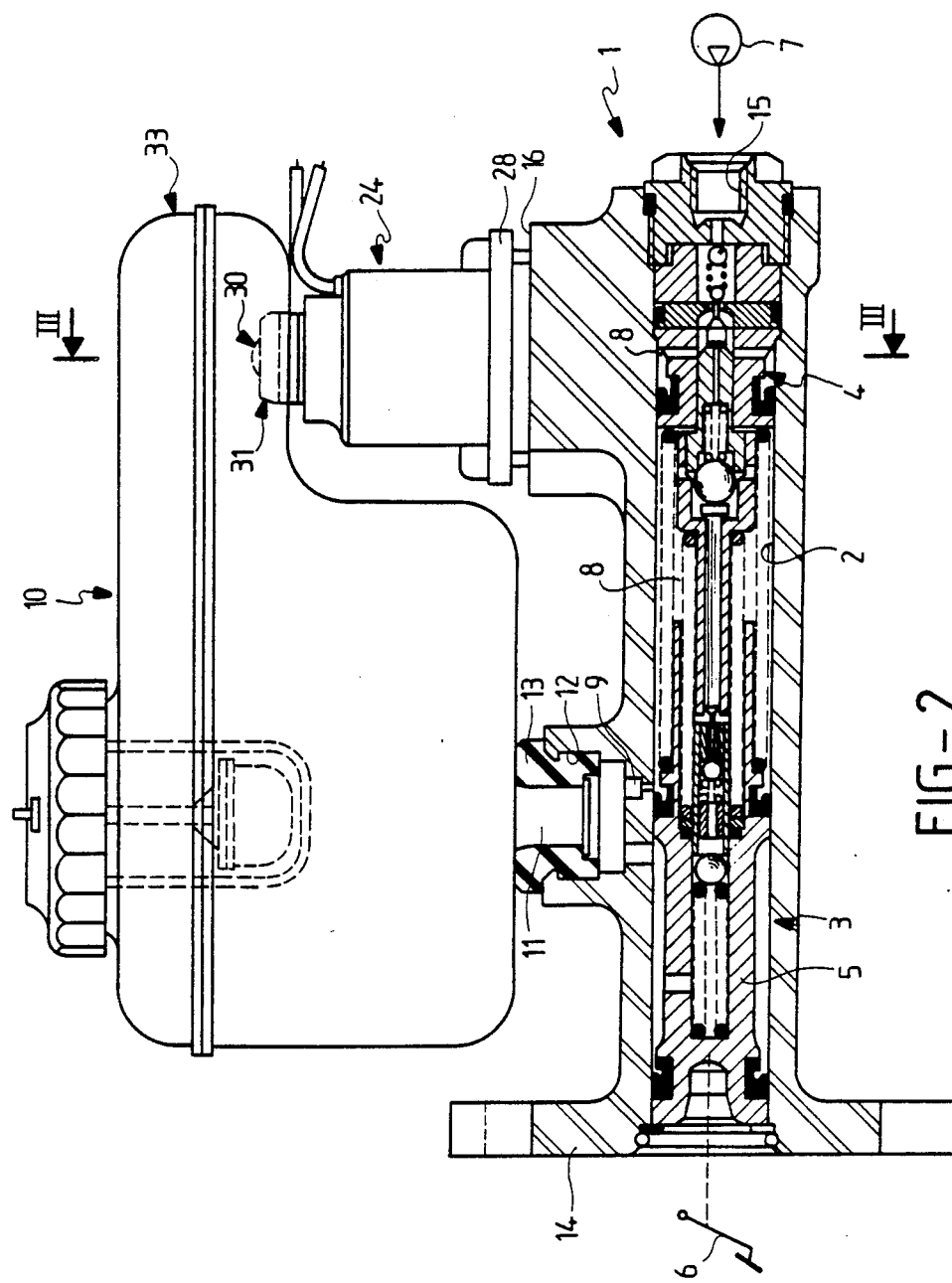
FIG. 2 is a side view, partially in longitudinal section, along the cutting plane II—II of FIG. 1.

The brake-pressure control and modulation group according to the invention comprises essentially, as can be seen more clearly in FIG. 2, a brake-pressure control device which is actuated manually and designated generally by the reference number 1 and which is of the general type described in the European Patent EP 0156677 and the contents of which are assumed to be integrated here by way of reference. Briefly, it will be remembered that the brake-pressure control device, which is of the hydrodynamic type with a hydrostatic safety mechanism, comprises, inside a bore 2 in a body 3, a distribution valve assembly 4 which is actuated, via a master-cylinder piston 5 sliding in the bore 2, by a brake pedal 6 so as to convey fluid under modulated pressure from a pressurized-fluid source 7 to a fluid outlet 8 provided in the body and connected to a brake circuit, as will be seen below. In order to ensure operation by hydrostatic means, in the event of interruption of the pressure source 7, the master-cylinder chamber 8A, which is defined in the bore 2 between the master-cylinder piston 5 and the distribution valve assembly 4, is supplied, conventionally, via a supply passage 9, by a reservoir which is generally designated by the reference number 10 and comprises a bottom connecting piece 11 engaged in a leak-tight manner in a seating 12 located in the body 3 and communicating with the passage 9, a sealing and mounting sleeve 13 being arranged in between. The body 3 has, at one of its ends, a flange 14 enabling it to be mounted on the fixed wall of a vehicle, and, at the opposite end of the bore 2, an element for effecting connection to the pressure source 7, which element defines an opening 15 for admitting the pressurized fluid.

Figure 3:
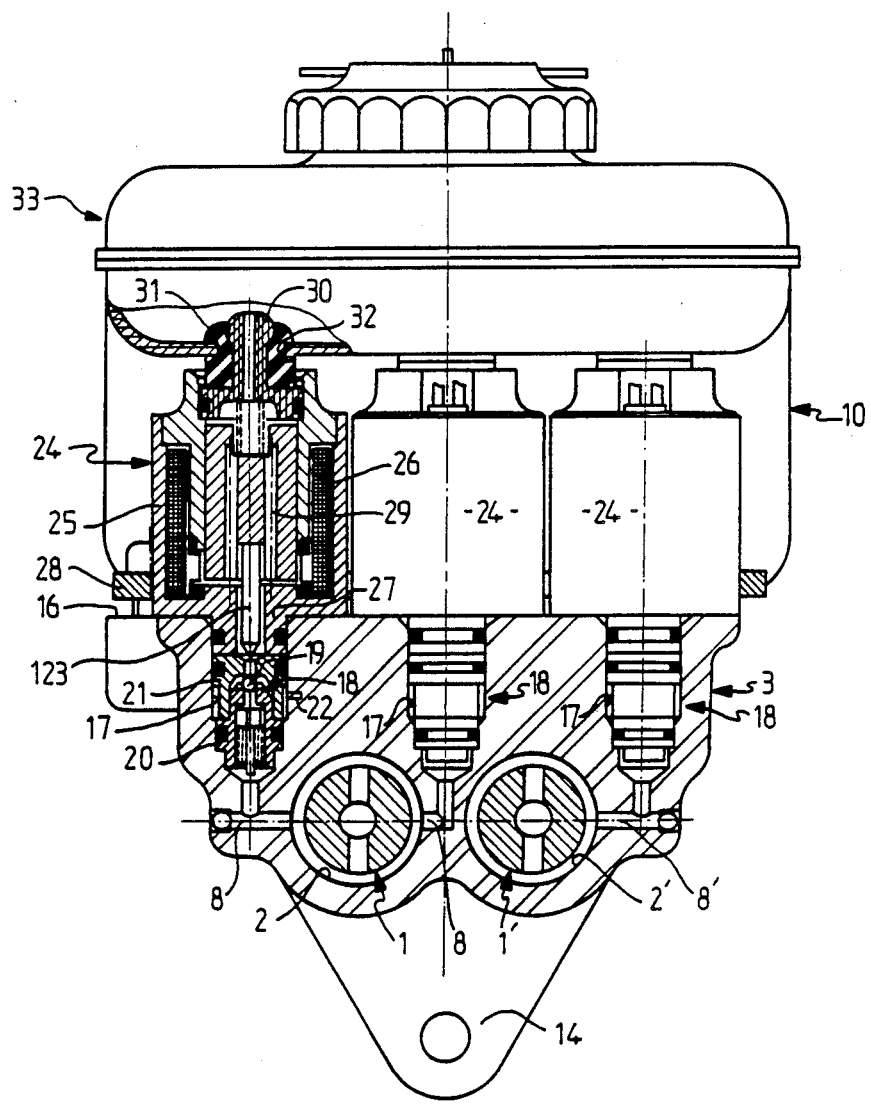
FIG. 3 is a front view, partially in crosssection, along the cutting plane at III—III of FIG. 2.

As can be clearly seen in FIGS. 2 and 3, the body 3 has, in the vicinity of its end opposite to that where the mounting flange 14 is located, a solid portion with a flat upper surface 16 perpendicular to which a stepped cylindrical seating 17 is formed, which seating communicates with the fluid outlet 8 of the brake-pressure control device 1. This seating 17 contains a distribution valve sub-assembly 18 coprising a valve ball 19 which is displaceable between two coaxial and facing seats formed respectively in a lower valve base 20 and in an upper valve cage 21, both of them being engaged in a leak-tight manner inside the seating 17 and defining between them, inside the seating 17, an annular space communicating with the associated brake circuit via a channel 22 formed in the body 3 and comprising an orifice 23 for connection to the associated brake circuit I₁.

The valve ball 19 is actuated by a plunger 123 of a solenoid valve sub-assembly 24 comprising a casing 25, made of magnetic material, which encloses the electro magnet 26 and has a bottom tubular extension 27 engaged in a leak-tight manner in the seating 17, the casing 25 comprising a bottom flat surface resting against the surface 16 of the body 3 and being fixed in position on the latter by a bolted flange 28. The casing 25 and the plunger 123 have, running through them, a central fluid passage 29. According to one aspect of the invention, the casing 25 is closed, at the top, by a tubular element 30 which is made of non-magnetic material and engaged in a leak-tight manner, by means of an elastomer sealing and mounting sleeve 31, in a hole 32 formed in the bottom wall of an extension 33 of the reservoir 10, which extension extends the upper part of the latter so as to form an overhanging part directly above the solenoid valve sub-assembly 24, the distance between the bottom of this extension 33 and the surface 16 being determined in accordance with the axial extension of the solenoid valve sub-assembly 24. It can be understood that, in the case of such an arrangement, the control valve assembly 18 is located directly between the fluid outlet 8 of the device 1 (whether it operates in the normal hydrodynamic way or with hydrostatic assistance) and, on the one hand, the associated brake circuit, via the channel 22, or, on the other hand, the reservoir 10, via the internal tubular passage 29 in the solenoid valve sub-assembly 24.

During normal use of the brake-pressure control device (i.e. in conditions not requiring antilocking control), the winding 26 of the solenoid valve sub-assembly 24 is not energized and the valve ball 19 is kept elastically pressed against the seat of the upper cage 21, thereby isolating the brake circuit 22-$I_1$ from the reservoir 10 and keeping it permanently connected to the fluid outlet 8 of the device 1. On the other hand, during antilocking control, the sensors of the brake circuit $I_1$ which are associated with the wheels to be braked and the electronic antilocking unit selectively actuate the solenoid valve sub-assembly 24 in order to isolate the brake circuit 22 -$I_1$ from the fluid outlet 8, reduce the pressure in this brake circuit by allowing fluid to flow back to the reservoir 10, and selectively re-introduce the brake pressure into the brake circuit.

In the embodiment shown inFIGS. 1, 3 and 4, it will be noted that the body 3 has in fact two parallel bores 2 and 2' which each receive a brake-pressure control device 1 and 1' (both actuated by the pedal 6), the control device 1 comprising two fluid outlets 8, each of which is intended for a part of a corresponding brake circuit $I_1$ and $I_2$ each provided with a solenoid valve means 18, 24 (typically for the front left-hand and front right-hand brakes of the vehicle), the second pressurecontrol device 1' comprising a single fluid outlet 8' communicating, via an associated valve assembly 18, with its own brake circuit II (typically the brake circuit for the rear wheels of the vehicle).

Although the present invention has been described with reference to specific embodiments, it is not limited as a result, but, on the contrary, is open to modifications and variations which may occur to a person skilled in the art.

I claim:

1. A brake-pressure control and modulation for at least one brake circuit of a motor vehicle, comprising, inside a body, at least one manually operable brake pressure control device having a fluid outlet in fluid communication with the brake circuit, a brake fluid reservoir mounted on the body, and an isolating and pressure-reducing solenoid valve means operable for controlling fluid flow in the brake circuit, the solenoid valve means being mounted on the body and having its discharge outlet formed by a discharge end opening into the reservoir and extending through an enclosing wall of the reservoir, the solenoid valve means being formed with an internal through passage and including a casing interposed between the body and an extension part of the reservoir, the discharge end being sealingly received in the extension part of the reservoir, the end thereof opposite said discharge end including a distribution valve part enclosing valve means and mounted in a recess in the body which recess communicates with both a fluid outlet of the brake-pressure control device and with the brake circuit.

2. The system of claim 1, wherein the discharge end comprises a tubular member made of non-magnetic material which is mounted on the casing and received in an opening formed in a bottom wall of the extension part of the reservoir with interposition of a sealing and fixing sleeve member.

3. The system of claim 2, wherein the solenoid valve casing includes a tubular extension sealingly engaged in the recess of the body.

4. The system of claim 1 wherein said fluid outlet communicates with two brake circuits, and further including two said solenoid valves mounted in parallel on the body, each said solenoid valve controlling fluid flow in a respective brake circuit of said two brake circuits.

5. The system of claim 4, comprising two said brake-pressure control devices arranged in parallel in the body, each having a said fluid outlet connected to at least one associated brake circuit, each brake circuit being controlled by a respective said solenoid valve.

6. The system of claim 5, wherein the brake-pressure control device includes, inside the body, a manually operable metering valve arranged between a fluid inlet intended to be connected to a source of fluid under pressure, and the fluid outlet.

7. The system of claim 6, wherein the brake-pressure control device further includes a manually operable master cylinder piston in a master cylinder chamber, said reservoir being sealingly mounted on the body by means of a connecting member establishing communication with the master cylinder chamber.

8. The system of claim 4, wherein the reservoir has an upper part and a lower part and is mounted by its lower part on the body, said extension part extending the upper part in an overhanging manner above said solenoid valves.

* * * * *